March 9, 1965  E. F. GURNEE  3,173,050
ELECTROLUMINESCENT CELL
Filed Sept. 19, 1962
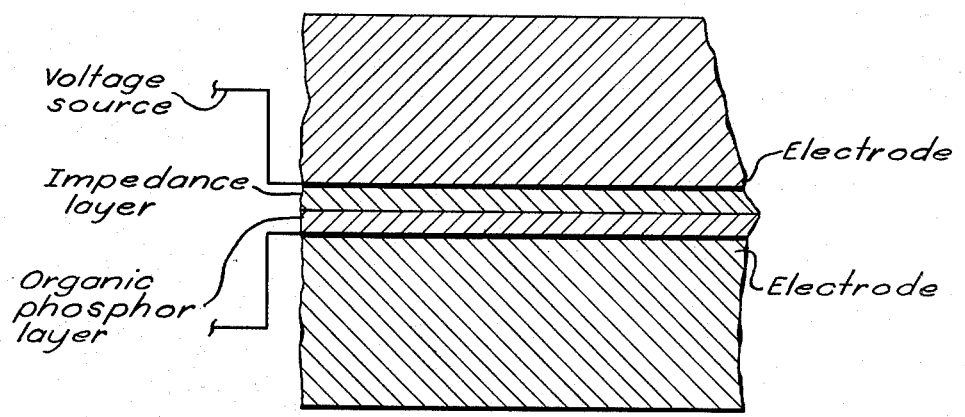
INVENTOR.
Edward F. Gurnee
BY
AGENT

United States Patent Office 3,173,050
Patented Mar. 9, 1965

3,173,050
ELECTROLUMINESCENT CELL
Edward F. Gurnee, Midland, Mich., assignor to The Dow Chemical Company, Midland, Mich., a corporation of Delaware
Filed Sept. 19, 1962, Ser. No. 224,655
13 Claims. (Cl. 313—108)

This invention relates to electroluminescent cells and a method for their preparation. It more particularly relates to electroluminescent cells which employ an organic phosphor composition.

Organic phosphor compositions which are useful for the generation of light in electroluminescent cells generally comprise fused or conjugated ring compounds such as anthracene, perylene, stilbene and the like, in admixture with electrically conductive materials such as metals, graphite, carbon and the like. Although such phosphors under the influence of a suitable electric field emit visible radiation, the quantity of such radiation which is emitted per unit area of the cell surface is oftentimes lower than desired. Such cells prepared using such phosphors generally must be energized by a relatively high voltage and high frequency source. By "high frequency" is meant an excitation of frequency greater than about 100 cycles per second and "high voltage" is used to denote voltages above about 200 volts. Generally such cells require voltages in the range of several hundred volts and sometimes require voltages of over 1,000 volts. These high voltages usually are impressed upon the cell using a frequency of 500 or even 2,000 cycles per second.

It is a principal object of the present invention to provide an electroluminescent cell having a relatively high brightness per unit area at low voltages.

An additional object of the present invention is to provide an improved method of preparing an electroluminescent cell utilizing organic phosphor compositions.

A further object of the present invention is to provide an electroluminescent cell utilizing organic phosphor compositions which have a high brightness at low voltages and low frequencies.

These benefits and other features and advantages in accordance with the invention are achieved by preparing an electroluminescent cell by (a) coating a conductive electrode with a thin coating of the organic phosphor composition; (b) providing adjacent said phosphor coating and remote from said electrode, a layer having an impedance sufficient to provide at least 5 percent to about 50 percent of the voltage drop across both layers across the impedance layer.

Also contemplated within the scope of the invention is an electroluminescent cell comprising an electrode, adjacent said electrode an organic phosphor layer, adjacent said organic phosphor layer and remote from said electrode an impedance layer, and adjacent said impedance layer and remote from said phosphor layer a second electrode.

The figure illustrates a cross sectional schematic representation of an electroluminescent cell in accordance with the invention.

The organic phosphor layers utilized in the present invention comprise: (1) a conjugated organic compound as host member, (2) a conjugated organic compound of condensed benzene rings as doping agent, or activator, and (3) a finely divided electrical conducting material. Advantageously, all of these components will be substantially uniformly dispersed, although this is not a necessity for the production of electroluminescence by the phosphor. The phosphor host member is selected from any of a wide variety of conjugated organic compounds containing at least one benzenoid ring. Operable compounds may have in conjugated or condensed structure therewith, heterocyclic rings, one or more additional benzenoid rings, conjugated unsaturated aliphatic chains or conjugated alkaryl systems. Useful host compounds include, for example, naphthalene, anthracene, phenanthrene, pyrene, benzpyrene, chrysene, picene, carbazole, fluorene, biphenyl, terphenyls, quarterphenyls, triphenylene oxyide, dihalobiphenyl, transtilbene, 1,4-diphenyl butadiene and the like.

The doping agent, or activator, to be utilized with a given host will be a conjugated benzenoid compound having at least three condensed benzene rings and generally will be a member selected from the group consisting of anthracene, tetracene and pentacene, although members of other three ring or larger condensed ring systems can be employed. From about 0.0001 to about 10 percent or more weight percent of the doping agent can be used with a given host to give operable phosphors. Preferably, from about .01 to about 2 weight percent of the activator is added to the host. For optimum results, the preferred amount of activator is from about 0.03 to about 0.6 weight percent. The selection of a given doping agent to be used in preparing a phosphor will be governed by the color of light desired from the phosphor in an electroluminescent cell. For example, preparation of an electroluminescent cell containing anthracene as a doping agent will result in a blue-hued electroluminescent color. A cell wherein tetracene is utilized as the activator for the phosphor will result in a green light. A cell having pentacene as a doping agent for the phosphor will result in a red-hued light upon electrical activation of the cell. A mixture of the appropriate doping agents can be used with a given host to give an electroluminescent light the color of which is the expected supplementary colors to be obtained from a mixture of the colors of the individual activators.

With host members which themselves exhibit luminescence when subjected to ultraviolet light, for example anthracene, an electroluminescent phosphor can be realized by direct addition of the finely divided electrical powder to such a host without use of additional doping agent or activator. However, a brighter electroluminescence of narrower color range is produced if the host member and activator are of different structure. To illustrate, anthracene desirably will be used as a host in phosphors wherein the activator is tetracene, pentacene and similar condensed aromatic ring systems other than anthracene. Alternatively, to obtain a bright, blue electroluminescence, anthracene will be used as doping agent with a host compound other than anthracene, for example naphthalene, terphenyl, fluorene, carbazole, phenanthrene and members of other conjugated benzenoid ring systems.

The finely divided electrical conducting material which necessarily must be added to the mixture of organic host and doping agent in order to obtain electroluminescence therefrom can be selected from any one of a variety of conducting materials including, for example: powdered metals, powdered metal oxides, powdered metal sulfides, carbon, and other materials with appreciable conductivity. For most practical applications, finely divided carbon preferably will be utilized in the preparation of the phosphors for the electroluminescent cells of the instant invention. Particularly beneficial and advantageous for the practice of the present invention are powdered conductor having a particle size as determined by measurement in an electron microscope of from about 100 Angstroms to about 30,000 Angstroms. Preferably, such particles are utilized having diameters from about 100 to about 10,000 Angstroms. A particularly advantageous conductor is carbon in the form of graphite. Generally, from about 0.08 to about 4.0 percent by volume of the finely divided conducting material will be utilized in the phosphors of the instant invention. Advantageously from about 0.2 volume percent to about 2 percent by volume of the powdered conductor is incorporated into the phosphors of the instant invention.

In preparing the electroluminescent phosphor, good color is obtained if the components, i.e. host, doping agent and electrically conducting powder, are mixed intimately together by grinding these to a finely divided state either alone or in the presence of an inert carrier. However, increase in electroluminescent color production is found if the host and doping agent are first cocrystallized from a solvent and the electrically conducting powder then mechanically admixed into the liquid dispersion or solution of the organic compounds. As an alternative to this latter method, the host and doping agent first can be cocrystallized from a suitable solvent such as benzene, toluene, xylene, acetone, alcohols and the like, and the finely divided electrical conducting material then be mixed with the so-produced crystals. This resulting mixture can again be heated until the organic materials melt and the mixture of fluid host and activator plus solid electrical conducting powder then be allowed to cool until the host and doping agent, with conducting powder dispersed therethrough, again crystallize, and disperse in the solvent.

Preferably, in the preparation of electroluminescent cells in accordance with the present invention, a dispersion is prepared of the particulate electronic conductor in a solution of the organic phosphor and the resultant solution is sprayed onto a suitable electrode. Beneficially, the spraying operation easily permits the layer to be applied to the electrode in a uniform, thin coating which is more uniform than can be generally obtained by other conventional coating methods.

In order to provide a maximum brightness and serviceability generally the phosphor for the electroluminescent cells of the present invention should be deposited in a thickness of from about 0.3 micron to about 10 microns and advantageously for most practical purposes in a thickness of from about 1 micron to about 5 microns. When such a phosphor coating is deposited on a conductive electrode the thickness of the coating should in general exceed the thickness of the largest conductive particle incorporated therein; however, if a very minor portion of such conductive particles such as about 1 percent or less exceed the thickness of the phosphor layer in the larger dimension no significant reduction in the light output of the cell is observed. If the number of particles having dimensions larger than the thickness of the phosphor layer is increased a gradual drop in light output is observed. As the proportion becomes substantial then electroluminescence ceases or is reduced to an impractical value.

Typical solvents which are utilized in the preparation of electroluminous coating dispersions are such materials as benzene, toluene, xylene, acetone, chloroform, acetonitrile, carbon tetrachloride, tetrachloroethylene, and mixtures thereof.

The high impedance layer utilized in the practice of the invention beneficially may be of the dielectric type, that is, an insulator having a relatively high dielectric constant or, alternatively, it may be material having a relatively high specific resistivity or low conductivity. If a material is utilized which is of the dielectric nature, the resultant cell is particularly useful with an alternating current. If on the other hand a material of low conductivity is employed, the cell is found to respond both to alternating current and direct current power sources. Desirably, the materials used in the impedance layer, if the dielectric approach is utilized, should have a dielectric constant above about 15. If materials of low conductivity are utilized, conductivities in the range of from about $10^{-2}$ to about $10^{-14}$ (ohm-cm.)$^{-1}$ are desirable.

In the actual preparation of an electroluminescent cell such as is illustrated in the accompanying figure, it is desirable to prepare the cell in such a manner that a relatively small proportion of the voltage drop across the cell should appear across the impedance layer.

In order to obtain cells of maximum brightness, relatively thin phosphor layers are employed and if the phosphor layer, which includes electronic conducting particles, is sandwiched between two materials of a high conductivity such as conductive glass or metal, generally nonuniform or irregular electroluminescence occurs and, frequently, the cell is destroyed because of the voltage breakdown within the phosphor layer. Bright electroluminescent cells in accordance with the invention utilize an impedance layer adjacent to the conductive layer and no tendency toward arc-over is observed and yet, the phosphor with suitable excitation by an applied voltage provides a relatively high brightness per unit area. Such organic phosphors in the absence of the impedance layer do not give satisfactory lighting for most purposes.

Suitable materials for the impedance layer are organic and inorganic compounds having a high dielectric constant (i.e. over 5) such as methyl cellulose, polyvinyl alcohol, barium titanate and the like, including glycerin which is also conductive. Beneficially, a liquid material is utilized or one which may be applied in the form of a liquid, such as a solution. The application of the liquid impedance layer provides a uniform and complete coverage of the phosphor layer improving the laminating characteristics of most practical cells and preventing the diffusion of undesirable gasses or liquids therein. Depending on the particular method of construction of the cell used, the impedance layer may be either transparent or opaque. If, for example, a cell is assembled utilizing as one electrode a glass having a conductive coating thereon, the phosphor may be placed adjacent the glass, an opaque impedance layer employed, and a suitable second electrode either transparent or opaque. Beneficially, in the use of organic phosphor and the impedance layers in accordance with the invention the construction of an electroluminescent cell which emits light from both its major surfaces is permitted. By utilizing two layers of conductive glass and a transparent impedance layer, usually the quantity of light emitted is about the same from either side of the cell. Beneficially, the high impedance layer may comprise an organic conductive material either alone or in admixture with a suitable binder. Typical organic materials which may be utilized for this application are organic complexes such as are set forth in the following table:

TABLE

| Compound: | Conductivity (ohm$^{-1}$-cm.$^{-1}$) |
|---|---|
| $(C_2H_5)NH^+(TCNQ^-)(TCNQ)$ | $7.4 \times 10^{-3}$ |
| $(C_9H_7)NH^+(TCNQ^-)(TCNQ)$ | $2.2 \times 10^{-4}$ |
| $Li^+(TCNQ^-)$ | $3.3 \times 10^{-6}$ |
| $K^+(TCNQ^-)$ | $1.9 \times 10^{-7}$ |
| (p-Chloranil)·(p-phenylenediamine) | $1.3 \times 10^{-9}$ |
| (o-Chloranil)·(p-phenylenediamine) | $1.5 \times 10^{-10}$ |
| (p-Chloranil)·(perylene) | $2.9 \times 10^{-13}$ |

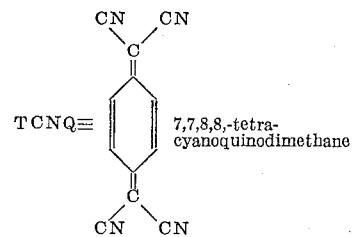

TCNQ ≡ 7,7,8,8,-tetracyanoquinodimethane

Beneficially, such cells prepared using a resistive layer are found to respond very well at low frequencies such as 60 cycles, 25 cycles, and even on direct current where satisfactory quantities of light are emitted. The intensity of the light emitted is generally higher than electroluminescent cells prepared using organic phosphors by heretofore known methods.

Example I

An electroluminescent cell was prepared by preparing a solution of anthracene containing 0.1 percent of tetracene based on the weight of the anthracene, in benzene, to a total solids concentration of about 1 percent. To this solution was added about 35 percent by weight based on the weight of the anthracene of a 10 percent by weight dispersion of graphite in mineral oil. The graphite had a particle size ranging from about 100 Angstroms to about 2 microns. This dispersion was then sprayed on the conductive surface of a piece of conductive glass to give a coating thickness of about 3 microns. The spray coating was dried at a temperature of about 30° centigrade, and was overcoated with a layer of glycerin. A copper electrode was placed in contact with the glycerin to provide a layer of glycerine about 2.5 mils in thickness. An alternating voltage was applied between the conductive layer of the glass and the copper electrode. The voltage was 110 volts at a frequency of about 60 cycles. The light output of the cell was found to be greater than that produced by commercially available electroluminescent cells designed for like voltage. Application of a direct current voltage of 110 volts to the above cell resulted in generally similar intensity of light.

Example II

In a manner similar to Example I, a cell was prepared with the exception that the high impedance layer utilized was applied from a solution of 3 percent methyl cellulose having a viscosity of 1,000 centipoises in a 2 percent aqueous solution at 25°. The methyl cellulose coating was dried and the resultant dry coating had a thickness of about 3 microns. Application of alternating current at a frequency of 1,000 cycles per second at about 150 volts produced a satisfactory brightness.

Example III

A cell was prepared in the manner of Example I with the exception that an organic complex was used for the impedance layer. The organic complex comprised parachloranil in a 1:1 molar ratio with p-phenylenediamine. Application of 110 volts at 60 cycles per second resulted in a lamp having similar light output to the cell of the previous illustration.

Example IV

A cell was prepared in a manner similar to Example I with the exception that K+ (TCNQ⁻) was applied over the phosphor layer as a powder. Excellent light output was obtained on application of 100 volts direct current and when the direct current voltage source was replaced by an alternating voltage source.

In a manner similar to the foregoing illustrations electroluminescent lamps of high brightness are readily prepared by applying an electroluminescent phosphor such as anthracene containing 0.1 percent tetracene to a conductive substrate and applying an impedance layer thereover such as p-chloranil-p-phenylenediamine 1:1 molar complex, o-chloranil-p-phenylenediamine 1:1 molar complex, p-chloranil-perylene 1:1 molar complex, glycerin, barium titanate, and the like.

Various modifications may be made in the method and manufacture of the instant invention without departing from the spirit or scope thereof and it is understood that I limit myself only as defined in the appended claims.

What is claimed is:

1. An electroluminescent cell comprising a conductive first electrode, an organic phosphor mixture deposited on the electrode in a layer having a thickness of from about 0.3 micron to about 10 microns, an impedance layer in contact with the phosphor layer, the impedance layer being in contact with a second electrode, wherein the organic phosphor comprises (1) a conjugated organic compound as a host member, (2) a conjugated organic compound of condensed benzene rings as doping agent, and (3) a finely divided electrical conducting material.

2. The cell of claim 1, wherein at least one of said electrodes comprises a glass having a transparent conductive surface.

3. The cell of claim 2, wherein said phosphor layer is adjacent said conductive coating of said glass.

4. The cell of claim 1, so constructed and arranged that a voltage drop between the first and second electrodes will provide from 50 to 95 percent of the voltage drop across the phosphor layer.

5. The cell of claim 1, wherein said finely divided electrical conducting material is graphite.

6. The cell of claim 5, wherein said graphite has a particle size about the thickness of the phosphor layer.

7. The cell of claim 5, wherein said graphite has a particle size of from about 100 Angstroms to 30,000 Angstroms.

8. The cell of claim 7, wherein the graphite is present from about 0.08 to about 4 percent by volume based on the total volume of the organic phosphor layer.

9. The cell of claim 1, wherein said impedance layer comprises a dielectric material.

10. The cell of claim 9, wherein said dielectric material has a dielectric constant of greater than 5.

11. The cell of claim 1, wherein said impedance layer comprises a material having a conductivity of from about $10^{-2}$ to about $10^{-14}$ (ohm-cm.)$^{-1}$.

12. A cell in accordance with claim 1, wherein the impedance layer is methyl cellulose.

13. A cell in accordance with claim 1, wherein said impedance layer comprises an organic complex of parachloranil in a 1:1 molar ratio with p-phenylenediamine.

References Cited in the file of this patent

UNITED STATES PATENTS 2,834,903     Roberts _____ May 13, 1958

OTHER REFERENCES

Article by Bernanos et al. in the Journal de Chimie et Physique 50 (1953), page 64.